United States Patent
Sonoda et al.

(10) Patent No.: US 7,149,922 B2
(45) Date of Patent: Dec. 12, 2006

(54) STORAGE SYSTEM (75) Inventors: Koji Sonoda, Sagamihara (JP);
Takahiro Nakano, Yokohama (JP);
Naoto Matsunami, Hayama (JP);
Takayoshi Iitsuka, Sagamihara (JP);
Yutaka Takata, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 557 days.

(21) Appl. No.: 10/393,293

(22) Filed: Mar. 21, 2003

(65) Prior Publication Data
US 2004/0158764 A1 Aug. 12, 2004

(30) Foreign Application Priority Data
Jan. 7, 2003 (JP) ............................. 2003-000758

(51) Int. Cl.
G06F 11/00 (2006.01)

(52) U.S. Cl. .............................................. 714/6; 714/7

(58) Field of Classification Search .................... 714/5, 714/6, 7
See application file for complete search history.

(56) References Cited

U.S. PATENT DOCUMENTS

| | | | |
|---|---|---|---|
| 5,163,131 A | | 11/1992 | Row et al. |
| 5,412,801 A | | 5/1995 | de Remer et al. |
| 5,555,389 A | * | 9/1996 | Satoh et al. ................ 711/100 |
| 5,761,705 A | * | 6/1998 | DeKoning et al. .......... 711/113 |
| 5,896,492 A | * | 4/1999 | Chong, Jr. ..................... 714/3 |
| 5,996,086 A | | 11/1999 | Delaney et al. |
| 6,144,999 A | | 11/2000 | Khalidi et al. |
| 6,317,844 B1 | | 11/2001 | Kleiman |
| 6,345,368 B1 | * | 2/2002 | Bergsten ...................... 714/11 |
| 6,516,380 B1 | | 2/2003 | Kenchammana-Hoskote et al. |
| 6,526,418 B1 | | 2/2003 | Midgley et al. |
| 6,578,160 B1 | | 6/2003 | MacHardy, Jr. et al. |
| 6,622,152 B1 | | 9/2003 | Sinn et al. |
| 6,631,478 B1 | | 10/2003 | Wang et al. |
| 6,694,447 B1 | | 2/2004 | Leach et al. |
| 6,721,765 B1 | | 4/2004 | Ghosh et al. |
| 6,725,392 B1 | | 4/2004 | Frey et al. |
| 6,732,124 B1 | | 5/2004 | Koseki et al. |
| 7,047,355 B1 | | 5/2006 | Nakatani et al. |
| 2002/0083111 A1 | | 6/2002 | Row et al. |
| 2002/0133737 A1 | | 9/2002 | Novick |
| 2003/0033383 A1 | | 2/2003 | Elnozahy et al. |

(Continued)

OTHER PUBLICATIONS

Daniel D. et al., "Distributed Logging for Transaction Processing" Proceedings of the 1987 ACM SIGMOD International Conference on Management of Data, 1987, pp. 82-96.

(Continued)

*Primary Examiner*—Robert Beausoliel
*Assistant Examiner*—Matthew Urick
(74) *Attorney, Agent, or Firm*—Mattingly, Stanger, Malur & Brundidge, P.C.

(57) ABSTRACT

A file server has plural NAS nodes having three processors dispersed in function, a shared cache memory shared between the plural NAS nodes and backed up by a battery, and plural storage devices. A log area for storing data with respect to an access request received by each NAS node is arranged in the shared cache memory. A network processor stores the data with respect to the access request to the log area, and transfers the data of the memory by a DMA at a reading time. Even when a failure is happened in a certain NAS node, another NAS node restores a file system using the log and continues processing to store the data with respect to the access request to the shared cache memory.

7 Claims, 6 Drawing Sheets

U.S. PATENT DOCUMENTS

| | | |
|---|---|---|
| 2003/0105767 A1 | 6/2003 | Sonoda et al. |
| 2003/0161468 A1 | 8/2003 | Iwagaki et al. |
| 2003/0163568 A1 | 8/2003 | Kano et al. |
| 2003/0163652 A1 | 8/2003 | Tsuge |
| 2003/0187885 A1 | 10/2003 | Miyazaki et al. |
| 2003/0195903 A1 | 10/2003 | Manley et al. |
| 2003/0221075 A1 | 11/2003 | Achiwa et al. |
| 2003/0225898 A1 | 12/2003 | Saika et al. |
| 2003/0236944 A1 | 12/2003 | Thompson et al. |
| 2004/0024977 A1 | 2/2004 | Delaney et al. |
| 2004/0059869 A1 | 3/2004 | Orsley |
| 2004/0078508 A1 | 4/2004 | Rivard |
| 2004/0107318 A1 | 6/2004 | Bono et al. |

OTHER PUBLICATIONS xFS Project Architecture, Oct. 8, 1993.
zFS Transaction Mechanism, Oct. 7, 1993
The Log Manageer (xLM), Mar. 28, 1994.
JFS overview, IBM, Feb. 25, 2000.
JFS Log.

* cited by examiner

LOG AREA ALLOCATING TABLE 750

| NAS NODE NUMBER (1110) | START ADDRESS (1120) | SIZE (1130) | EFFECTIVENESS (1140) |
|---|---|---|---|
| 1 | 0 | 1048576 | 1 |
| 2 | 1048576 | 1048576 | 1 |
| 3 | 2097152 | 1048576 | 1 |
| 4 |  |  | 0 |

FIG.4

LOG AREA MANAGING TABLE 412

| START ADDRESS (1210) | END ADDRESS (1220) | head (1230) | tail (1240) | SEQUENTIAL ID (1250) |
|---|---|---|---|---|
| 0 | 1048576 | 49152 | 512 | 756 |

FIG.5

LOG ENTRY DATA

| MAGIC NUMBER (1310) | SEQUENTIAL ID (1320) | HEADER SIZE (1330) | DATA SIZE (1340) | HEADER (1350) | USER DATA (1360) |
|---|---|---|---|---|---|

FIG.6

FSP REQUEST

| COMMAND (1410) | SEQUENTIAL ID (1420) | LOG AREA ADDRESS (1430) | ARGUMENT LIST (1440) |
|---|---|---|---|

STORAGE SYSTEM

BACKGROUND OF THE INVENTION

The present invention relates to a network storage system for performing processing according to an access request of a file unit (hereinafter simply written as an access request) from a client connected to a network.

A technique for increasing the operating speed of a conventional NAS (Network Attached Storage) uses a processor dispersed in function (which is a network processor, a file system processor and a disk processor respectively hereinafter abbreviated as NP, FSP and DP), and a cache memory communized between these processors. For example, this technique is shown in U.S. Pat. No. 5,163,131 (particularly, pp. 17 to 19 and FIG. 2).

In this literature, three processors are functionally dispersed and used. Processor utilization ratio is raised by performing the processing of the access request by the respective processors in parallel with each other in comparison with an SMP (Symmetric Multiprocessor) in which plural processors perform equal processing.

Further, the data movement between the processors and latency with respect to the processing of the access request can be reduced by sharing one cache memory in the plural processors and storing user data onto the cache memory. Here, the latency means a delay time taken until data are really transferred after the request of the data is made.

Further, the data movements between a memory of the NP and the cache memory shared by the plural processors, and between this cache memory and a storage device are made by a DMA (Direct Memory Access) so that the load of the processor is reduced. The DMA is to make the data movement without a CPU.

In this prior art, since the user data are stored to the cache memory and are processed, two data movements, i.e., the data movement between the memory of the NP and the cache memory, and the data movement between the cache memory and the storage device are required. In this case, when the data movement to the storage device is completed, a reply must be given to a client. Therefore, it is necessary to wait for the two data movements until the reply is given, thereby increasing the latency.

Further, since the data are stored onto the cache memory, there is a defect in that the data are lost when a failure is happened in a server (hereinafter abbreviated as a file server) for providing a file.

SUMMARY OF THE INVENTION

An object of the present invention is to provide a file server for minimizing the data movement while processing with respect to the access request is performed by using the processor dispersed in function.

Another object of the invention is to provide a file server in which, even when a failure is happened in a certain NAS node, no access request received by this NAS node so far is lost and another NAS node continues the processing.

To achieve the above objects, in the invention, a shared cache memory able to be shared between plural NAS nodes and backed up by a battery and a shared cache memory access section for getting access to the shared cache memory are provided on the NAS nodes. In the shared cache memory, each of the plural NAS nodes provides a log area for storing data received from an external device, and a log area allocating table for setting the allocation of the log area to each NAS node. Further, a log area managing table for managing the log storing area by an NP of each NAS node is provided within the memory of the NP.

In accordance with the invention, it is possible to provide a file server for minimizing a data movement while processing with respect to an access request is performed by using processors dispersed in function. Further, it is possible to provide a file server in which, even when a failure is happened in a certain NAS node, no access request received by this NAS node so far is lost and another NAS node continues the processing.

DETAILED DESCRIPTION OF PREFERRED EMBODIMENT

Figure 1:
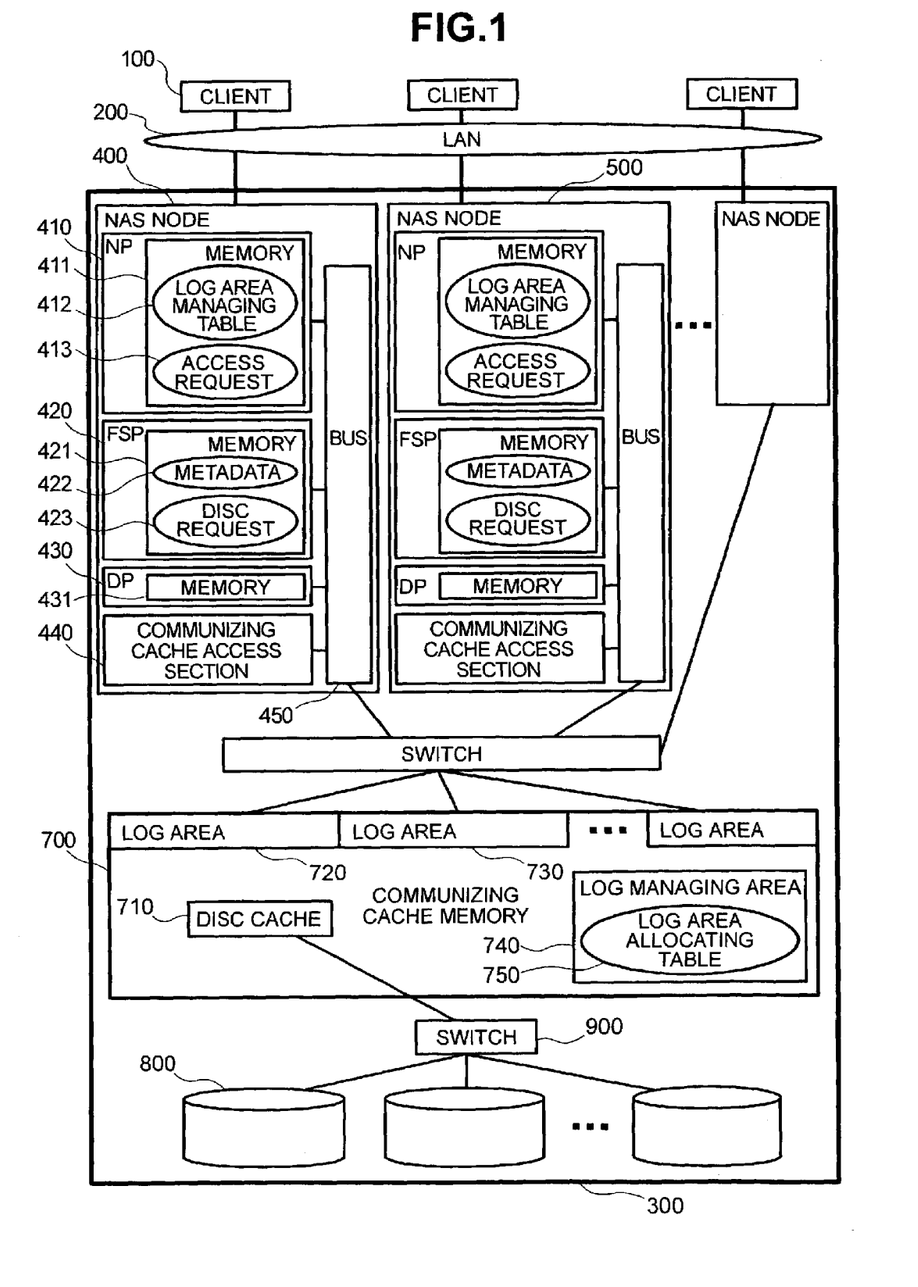
FIG. 1 shows the entire construction of a storage system in one embodiment of the present invention.

FIG. 1 shows a constructional example of a storage system in the present invention. Information stored to a memory is surrounded by a circle.

This system is constructed by a client 100, a LAN 200 and a file server 300. The file server 300 is connected to the client 100 through the LAN 200.

The file server 300 is constructed by plural NAS nodes 400, 500, a shared cache memory 700, a storage device 800 and a switch 900. A bus may be also used instead of the switch 900. In FIG. 1, two switches are drawn, but the NAS nodes, the shared cache memory and the storage device may be also connected by one switch.

The NAS node 400 is constructed by an NP 410, an FSP 420, a DP 430, a shared cache access section 440 and a bus 450. These members 410 to 440 are connected to each other through the bus 450.

The NP 410 is connected the LAN 200, and has a memory 411. A log area managing table 412 described later and an access request 413 are stored to the memory 411. A main function provided by the NP is constructed as follows. 1) Log entry data described later are made from the access request received from a client, and are stored to the shared cache memory 700. 2) A request (hereinafter called an FSP request) with respect to the FSP 420 is made and transmitted. 3) An access result is received from the FSP 420. 4) The access result is made and transmitted to the client.

The FSP 420 has a memory 421. Managing information (hereinafter called metadata) of a file, an access request (hereinafter called a disk request) with respect to the storage device and an incomplete request list described later are stored to the memory 421 to manage a file system at high speed. A main function provided by the FSP is constructed as follows. 1) An FSP request received from the NP 410 is analyzed (an address of the storage device is calculated), and the disk request is made. 2) The disk request is transmitted to the DP 430, and a result from the DP 430 is received and a result reply is given to the NP.

The DP 430 has a memory 431, and controls data transfer between the shared cache memory 700 and the storage device 800 in accordance with the disk request received from the FSP 420.

The shared cache access section 440 provides the function of a DMA for performing the data transfer by the NP, the FSP and the DP between each memory and the shared cache memory.

The shared cache memory 700 has a disk cache 710, log areas 720, 730 and a log managing area 740.

The disk cache 710 temporarily stores data of a block unit of the storage device. Reading and writing operations with respect to the storage device are performed through the disk cache 710. Since the disk cache 710 is hit by frequently accessed data, physical accesses to the storage device are reduced. In this embodiment, the form of arranging the disk cache and the log area within the shared cache memory is used. However, the form of setting the shared cache memory to a disk cache and arranging the log area within this disk cache may be also used.

Each of the log areas 720, 730, etc. corresponds to each NAS node, and the access request received by each NAS node is stored as log entry data described later.

Figure 3:
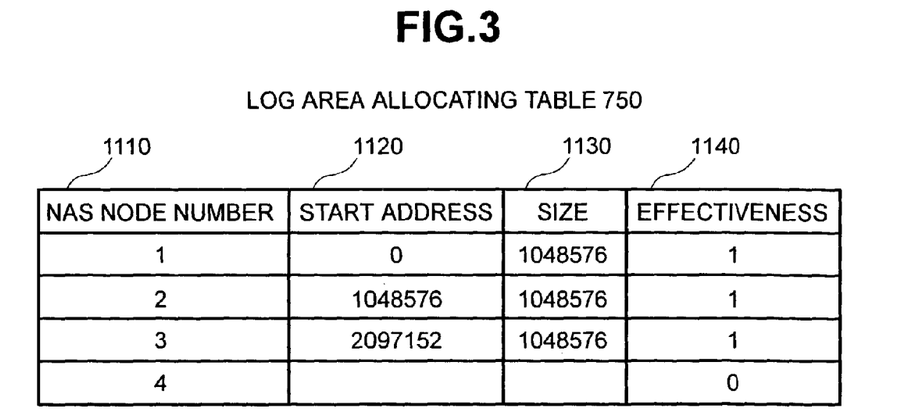
FIG. 3 shows the data construction of a log area allocating table within a shared cache memory.

The log managing area 740 has a log area allocating table 750 for managing the position of each log area. Here, a constructional example of the log area allocating table is shown in FIG. 3. A NAS node number 1110 shows a NAS node corresponding to each log area. A start address 1120 shows a start position of each log area. A size 1130 shows the size of each log area. The size 1130 may be set to a suitable fixing value by the system in advance, but may be also changed by the user of a file server in accordance with the size of the shared cache memory and required performance. Effectiveness 1140 shows whether each log area can be used or not.

The shared cache memory 700 is backed up by a battery and the shared cache memory 700 can be accessed from any NAS node. Therefore, even when a failure is happened in a certain NAS node, another NAS node can inherit and execute processing.

Figure 2:
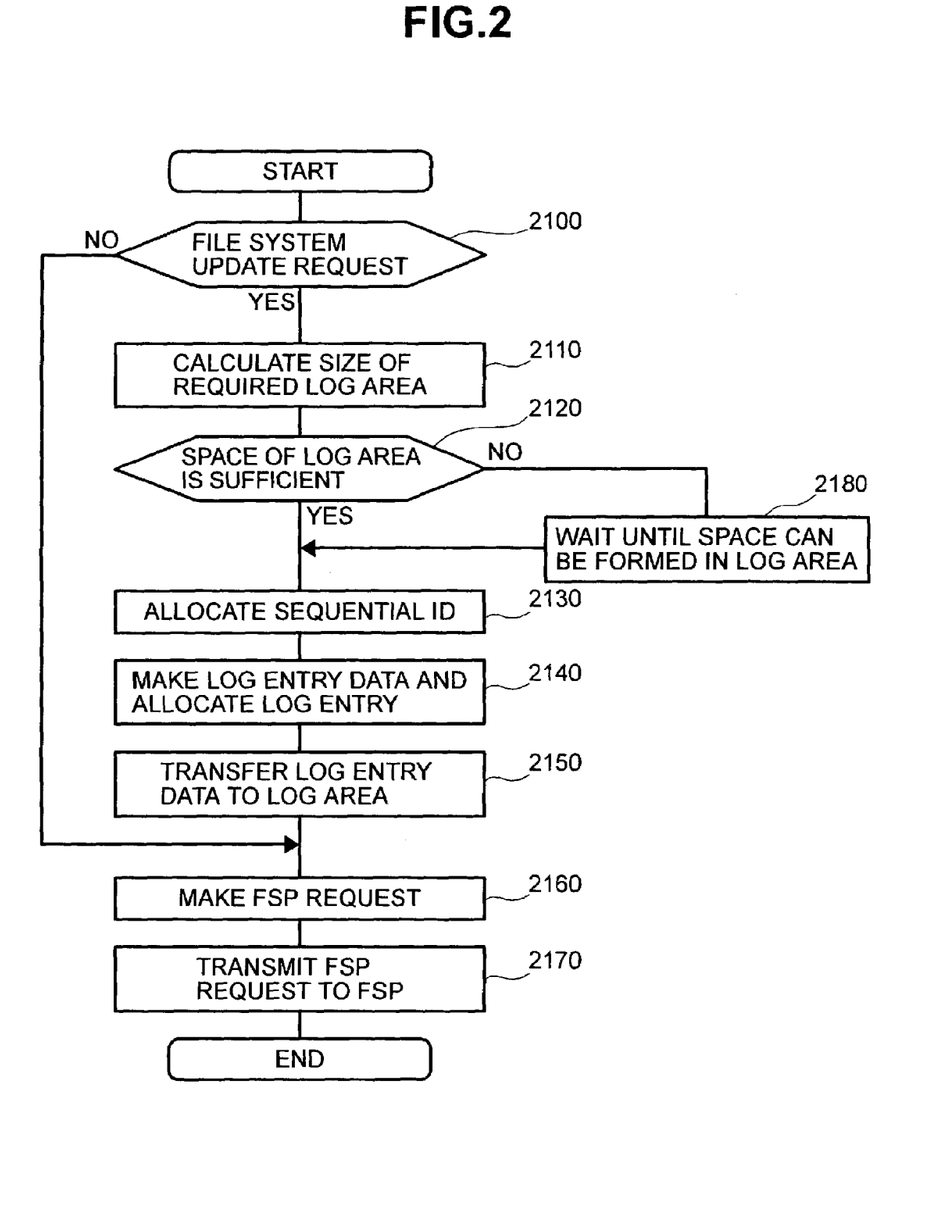
FIG. 2 shows a processing flow at a file access request receiving time of an NP 410 in FIG. 1.

A processing procedure of the access request performed by the NP will next be explained by using FIG. 2. When the access request is first received from the LAN 200, it is judged whether the access request is an update request of the file system or not (step 2100). In an NFS version 3 (registered trademark of Sun Mirosystems, Inc. in the United States of America), there are create, mkdir, remove, rename, rmdir, write, setattr, commit, etc. as an example of the update request.

When no access request is the update request, the processing of a step 2160 is executed. In contrast to this, in the case of the update request, data are made from the access request. A size required to store log entry data described later to the log area is calculated (step 2110), and a calculation is made with reference to the log area managing table 412 as to whether there is a sufficient space within the log area or not (step 2120).

Figure 4:
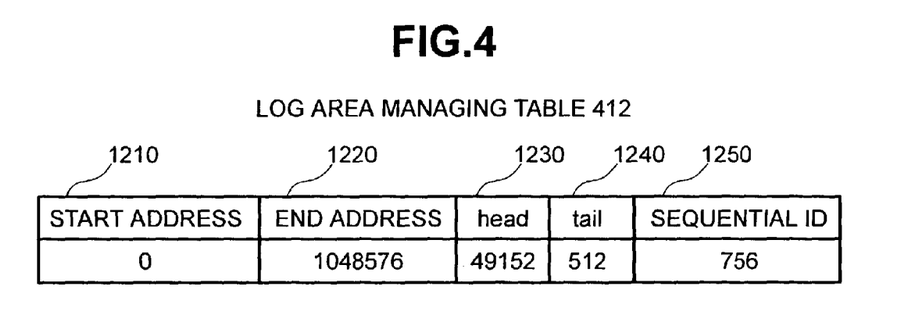
FIG. 4 shows a log area managing table arranged within a local memory of the NP 410.

Here, a constructional example of the log area managing table 412 is shown in FIG. 4. A start address 1210 and an end address 1220 respectively show a start position and an end position of the log area. Head 1230 and tail 1240 respectively show first and final addresses of a log entry for storing data not completely yet written to the storage device. A sequential ID shows a number simply increased and added to the log entry every order of data transmitted from the client.

Figure 5:
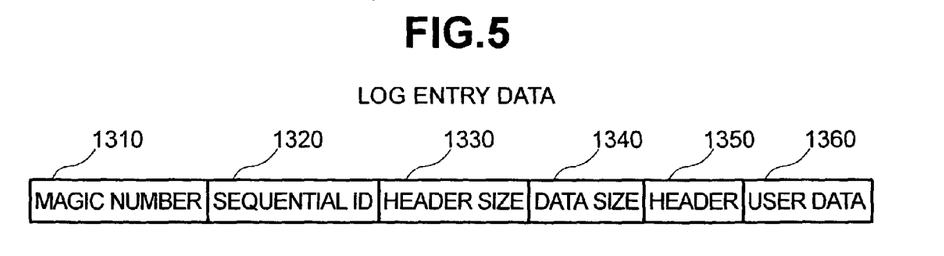
FIG. 5 shows the construction of a log entry stored to a log storing area.

Here, the log entry is an area as shown in FIG. 5, and is stored to the log area. The data within the log entry are hereinafter called log entry data. A magic number 1310 is a value showing the head of a usable log entry, and the same value is used in all log entries. A sequential ID 1320 is an ID allocated in a step 2130. A header size 1330 is the size of a log entry header. A data size 1340 is the size of user data stored to the log entry.

The size of the entire log area can be calculated by subtracting the start address from the end address. The log area is utilized in a ring shape, and the area from the head to the tail among the entire log area is an area used at present. Accordingly, the free space size of the log area can be calculated by subtracting the size between the head and the tail from the size of the entire log area.

When there is no sufficient space of the log area in a step 2120, the storage system waits until the sufficient space can be formed (step 2180). In contrast to this, when there is a sufficient space of the log area in the step 2120, or a sufficient space of the log area is formed in the step 2180, the sequential ID is allocated to the log entry (step 2130). Namely, the sequential ID is read from the log area managing table 412, and is set to a sequential ID allocated to this log entry. A value for the subsequent log entry provided by increasing the sequential ID by one is stored to the area of the sequential ID.

Next, log entry data are made and the log entry for storing the log entry data is allocated onto the log area with reference to the log area managing table 412 (step 2140). The allocated area is an area of the log entry size from an address shown by the head 1230 of the log area managing table 412. When the log entry is allocated, the value of the head 1230 is increased by the log entry size.

Next, the made log entry data are stored to the allocated log entry by using the shared cache access section 440 (step 2150). The shared cache access section 440 can get access to both the memory 411 arranged in the NP 410 and the shared cache memory 700 by the DMA. Namely, when the NP gives an instruction, which has the address of the memory 411 of the transferred log entry data and the address and the size of the log area at a transfer destination, to the shared cache access section 440, the shared cache access section 440 reads the log entry data from the memory of the NP, and writes the read log entry data to an address within an assigned log area. When the transfer is completed, the shared cache access section 440 notifies the completion to the NP by interruption.

Figure 6:
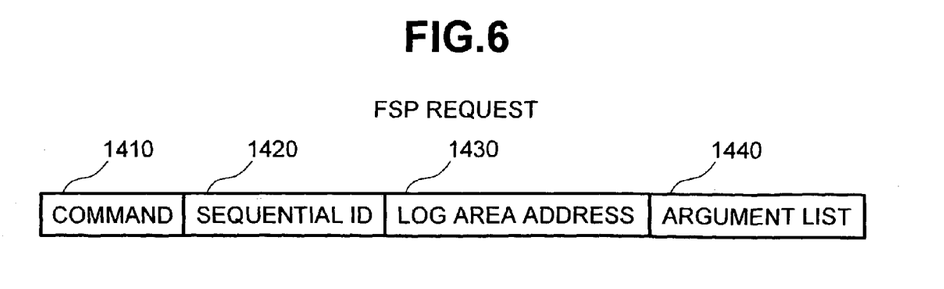
FIG. 6 shows the construction of the file access request issued from the NP 410 to an FSP 420.

Next, an FSP request is made (step 2160). FIG. 6 shows a constructional example of the FSP request. A command 1410 is used to get access to a file system, and an argument list 1440 is assigned if it is needed. Even when the access request has user data as in a write request, the address of the log area of data transferred in the step 2150 is stored to a log area address 1430 without storing the user data to the FSP request. When no access request is an update request, no entries of the sequential ID 1420 and the log area address 1430 are used. Finally, the FSP request is transmitted to the FSP (step 2170).

The NP starts processing for transmitting a response (hereinafter called an access response) to the access request to the client when the response from the FSP is received. Hereinafter, a processing procedure with respect to the access response made by the NP will be explained by using FIG. 7.

Figure 7:
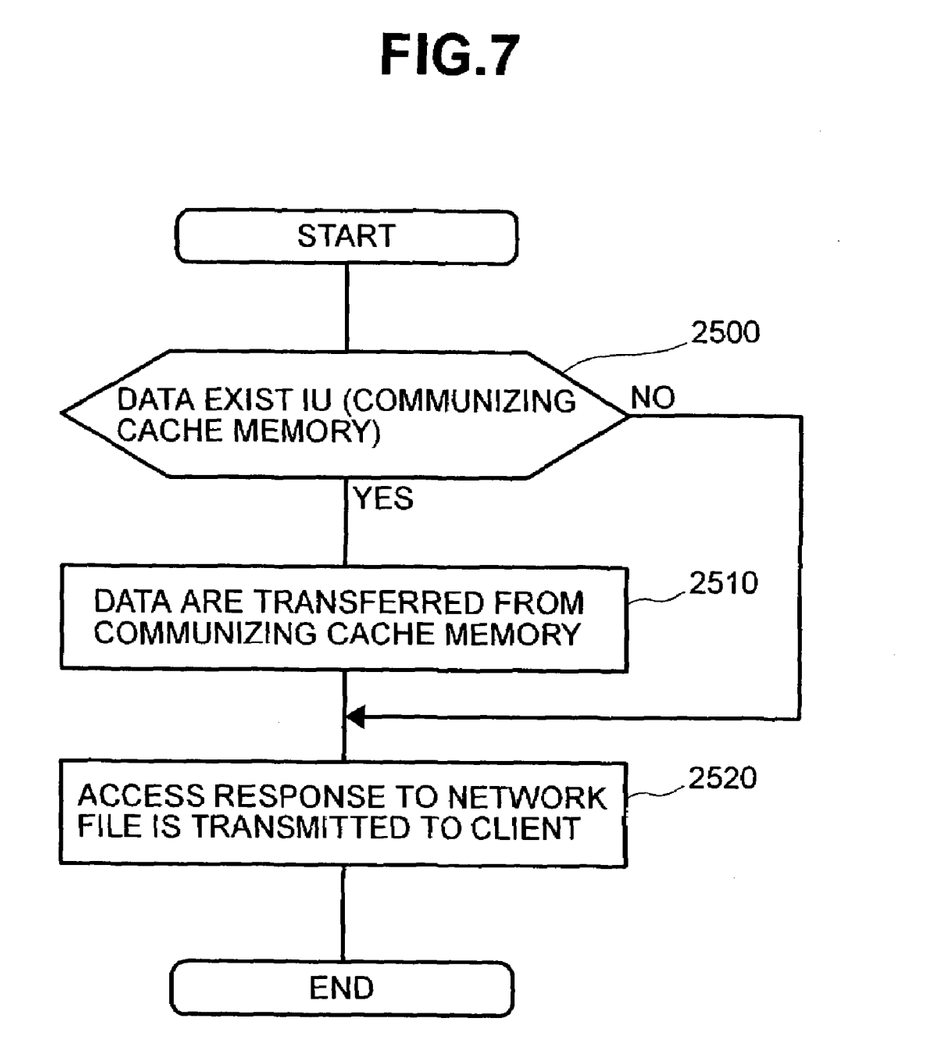
FIG. 7 shows the flow of file access response processing of the NP 410.

When the response from the FSP is received, it is examined whether an address of the shared cache memory 700 is included in this response or not (step 2500). When this address is included (in the case of a read request), user data exist in the shared cache memory 700. Accordingly, the user data are transferred from the shared cache memory 700 to the memory 411 in the NP by using this address (step 2510). Similar to the step 2150, this processing is executed by using the shared cache access section 440. In contrast to this, when no address is included in the response, the processing of a step 2520 is executed. Finally, an access response is made by using the response and the user data, and is transmitted to the client (step 2520).

Figure 8:
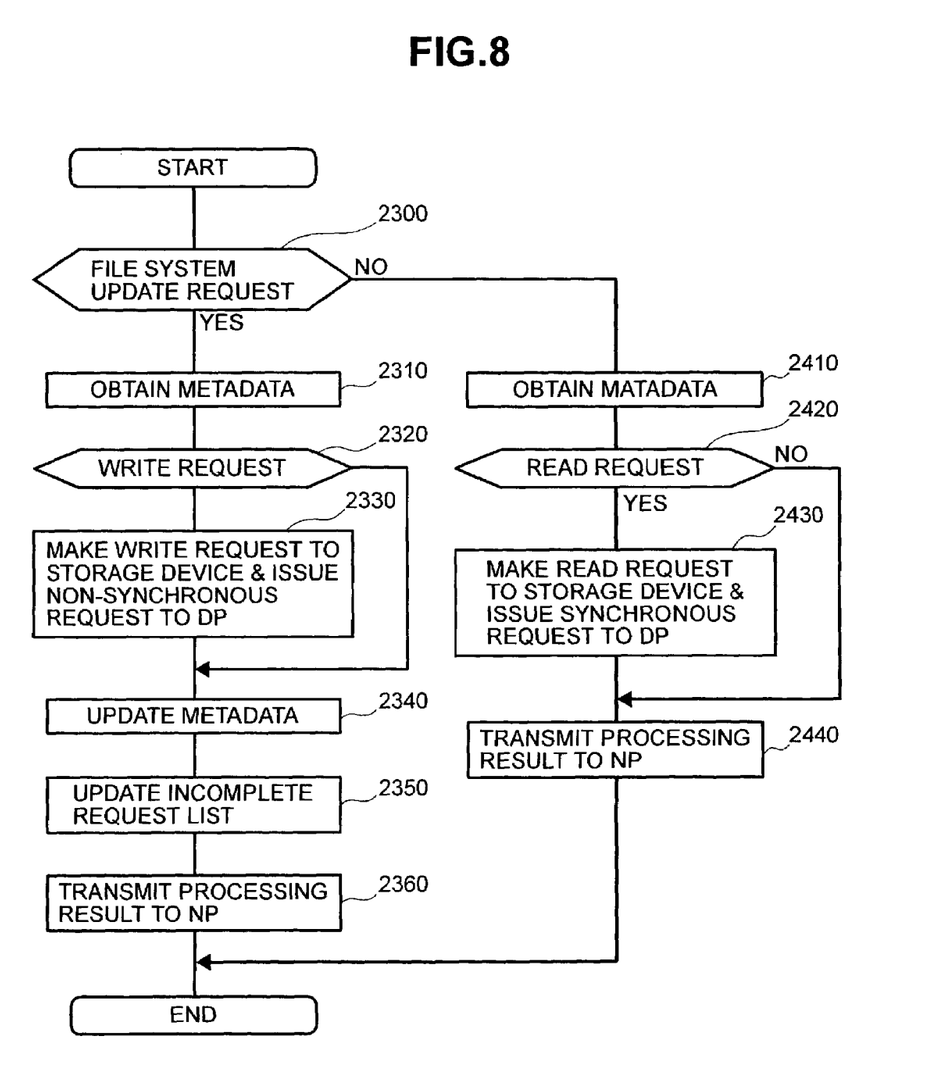
FIG. 8 shows the flow of processing of a file system update request of the FSP.

Processing of the access request made by the FSP will next be explained by using FIG. 8. First, it is examined whether an FSP request received from the NP is a file system update request or not (step 2300).

In the case of the file system update request, the memory 421 is retrieved and required metadata are obtained (step 2310). When no metadata exist in the memory 421, the storage system asks the DP to read the pertinent metadata from the storage device to the memory 421.

Next, it is examined whether the file system update request is a write request or not (step 2320). When the file system update request is no write request, no user data exist. Therefore, the processing of a step 2340 is executed.

In contrast to this, in the case of the write request, a disk request is made and is asynchronously issued to the DP (step 2330).

In the invention, the user data are stored to the log area, and its address is stored to the log area address 1430 (FIG. 6) of the FSP request. The FSP makes a disk request constructed by this address, a data size stored to the argument list in the case of a write command, offset information of a write file, the address of the storage device able to be obtained from the metadata obtained in the step 2310, etc.

In general, in the file access, it is necessary to give a reply to the client by guaranteeing that the user data are stored to the storage device. In the invention, since the user data are already stored to the shared cache memory 700 backed up by a battery, it can be equally considered that the user data are stored to the storage device. Therefore, the FSP can issue the write request to the storage device asynchronously and it is not necessary to wait for its completion.

Here, the asynchronous write request processing of data in the step 2330 is realized as a data copy within the shared cache memory. Namely, the DP gives an instruction to the shared cache access section 440 such that the data of an assigned address of the log area is copied at a specific address of the disk cache 710. The shared cache access section 440 reads the data of the log area by the DMA and writes these data onto the disk cache 710.

Next, the FSP updates the metadata in accordance with the file system update request (step 2340). However, it is not necessary to immediately write the updated metadata to the storage device, but the writing of dirty metadata is collectively executed in synchronous processing periodically executed. Here, the data of the memory unwritten yet to the storage device are called dirty data. Thus, it is not necessary to execute the frequent writing of the dirty data to the storage device. Log entry data for updating the file system are stored to the log area backed up by a battery. Therefore, even when a failure is happened in a NAS node, the file system can be restored by performing reexecution using the log entry data left in the log area.

No log entry can be released until the dirty metadata of the NAS node are completely written to the storage device.

Accordingly, the FSP holds an incomplete request list onto the memory 421 to manage which log entry the dirty metadata located in the memory 421 of the FSP correspond to. The incomplete request list is a list of the FSP request in which the dirty metadata are still left on the memory 421. When the update of the metadata on the memory is completed in the step 2340, the FSP connects its FSP request set to an opportunity to the incomplete request list (step 2350). The FSP refers to this list at the completing time of the periodic synchronous processing described before, and notifies the sequential ID1420 of the FSP request terminated in the writing of the updated metadata to the storage device to the NP, and releases the log entry within the log area. Further, in the synchronous processing, the FSP sets a newest sequential ID for the writing to the storage device to one portion of the metadata, and performs an operation for knowing until which log entry within the log area the file system of the storage device corresponds to. Finally, the FSP transmits the processing results to the NP (step 2360).

When it is no update request of the file system in the step 2300, required metadata are obtained (step 2410). This processing is similar to that in the above step 2310.

Next, it is examined whether the FSP request is a read request or not (step 2420). If the FSP request is no read request, no user data exist so that a step 2440 is executed.

In contrast to this, in the case of the read request, it is examined whether the user data exist in the shared cache memory or not. When no user data exist, the read request with respect to the storage device is made and synchronously issued to the DP (step 2430). At this time, the FSP gives instructions to the DP such that data read from the storage device are stored to only the shared cache memory 700, and the address of the shared cache memory 700 is notified to the FSP. This address of the shared cache memory 700 is finally notified to the NP, and the user data are transferred to the NP by the DMA. Therefore, it is not necessary to transfer the data via the memory of the FSP.

Finally, the processing results are transmitted to the NP (step 2440). The processing results are made by using the metadata obtained in the step 2410 and the address of the shared cache memory 700 obtained in the step 2430.

Write data assigned by the client are included in the log area. Therefore, it is necessary for the FSP and the DP to refer to the position and the data of the log entry as well as the NP. However, the log entry can be specified by the sequential ID added to each log entry.

In accordance with this embodiment, the write data are transferred from the NP to the shared cache memory by the DMA, and the read data are transferred from the disk cache 701 to the NP so that a data copy is minimized. Further, since the data copy is executed by the DMA, it is not necessary for each of the processors of the NP, the FSP and the DP to make a memory copy. The user data are read and written by the DMA between the NP and the shared cache memory. Therefore, the memory of the FSP can be almost used as an area for storing the metadata. As this result, the number of access times to the storage device can be reduced. As mentioned above, it is possible to provide a file server of high performance for processing the access request by a minimized data movement.

The processings of the NP, the FSP and the DP with respect to one access request are explained, but these processors can independently process plural access requests in parallel.

Figure 9:
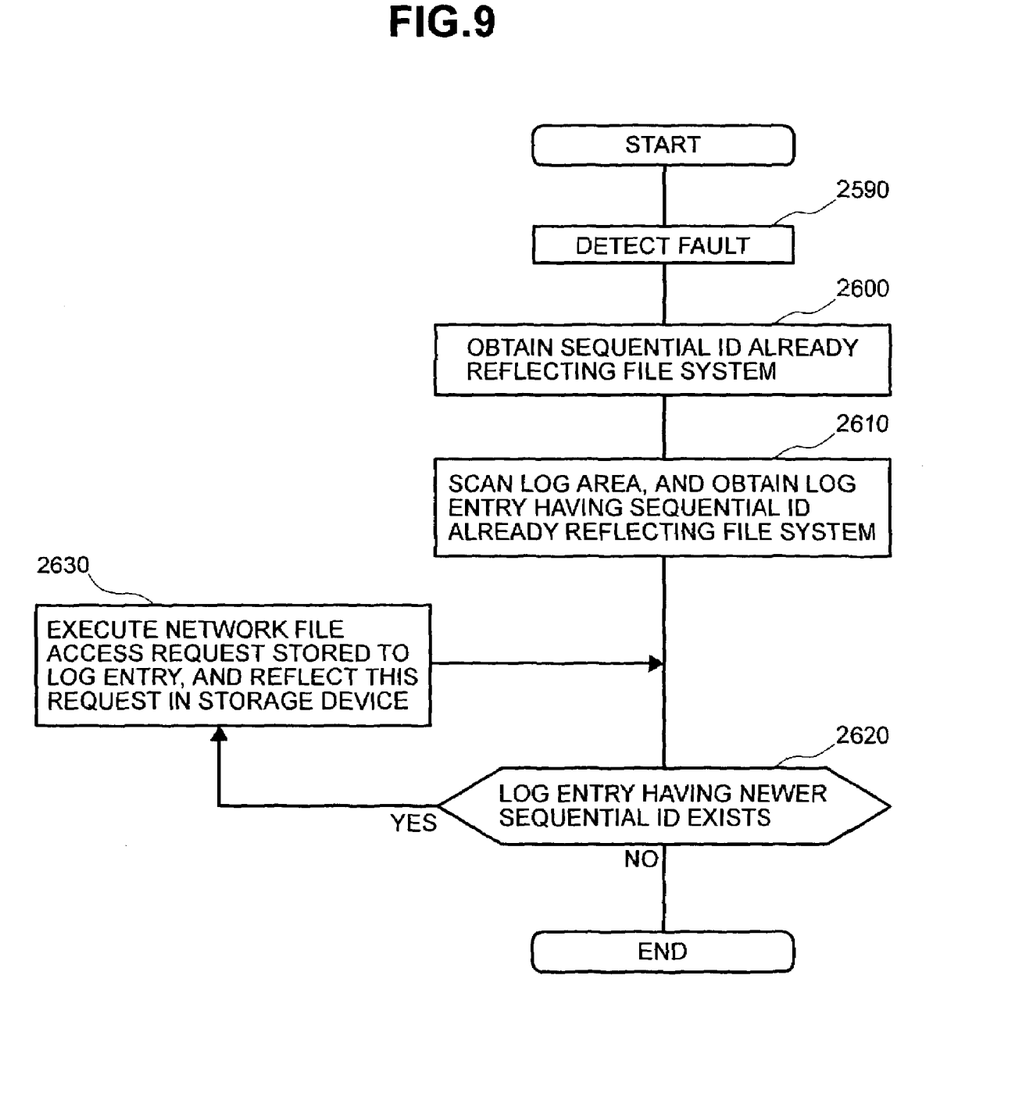
FIG. 9 shows the flow of file system inheriting processing.

A second embodiment of the invention will next be explained by using FIGS. 1 and 9. In this embodiment, the explanation is made with respect to processing in taking over the file system of a NAS node 400 by a NAS node 500 when a failure is happened in the NAS node 400.

A table for holding the state of each NAS node is set to the shared cache memory 700 in advance. Each NAS node periodically stores each self state to this table, and another NAS node similarly periodically checks this state. When it is detected that no state of another node is updated, it is judged that a failure is happened in the node (step 2590).

Next, the NAS node 500 gets access to a storage device 800, and obtains a sequential ID already reflected in the file system (2600). Here, the reflection shows that log entry data provided by updating the file system are written to the storage device. Next, the log area 720 of the NAS node 400 is specified with reference to a log area allocating table 750, and the log entry storing the sequential ID thereto is retrieved by scanning this log area with reference to a magic number 1310 of the log entry data (step 2610). Here, the scan shows that each log entry is read from the head of the log area.

If a log entry having a sequential ID newer than the sequential ID already reflecting the file system exists in the log area 720, this means an access request not reflected in the file system. The file system reflecting all the access requests can be constructed by reexecuting the access request not reflected in the file system in an old order.

Next, it is examined whether a sequential ID newer than the sequential ID already reflecting the file system exists or not (step 2620). When no newer sequential ID now exists, the reflection of all the access requests to the file system is completed so that the processing is terminated.

In contrast to this, when a log entry having the newer sequential ID exists, the access request stored to this log entry is executed and this result is reflected in the file system (step 2630). The steps 2620 and 2630 are repeated until all the log entry having the newer sequential ID has executed.

The NAS node 500 can update the file system processed by the NAS node 400 to a newest state by the above processing. Since all the access requests received by the NAS node 400 are stored to the log area 720, the AND node 500 can take over the file system without losing the data.

The storage device uses a magnetic medium in many cases, but may also utilize another medium such as an optical medium, etc.

What is claimed is:

1. A storage system comprising a cache memory, plural storage controllers and a storage device,
   in which said cache memory is connected to said plural storage controllers;
   said storage controller has a network processor, a file system processor and a disk processor;
   said network processor has means for making and storing first data for storage to said cache memory from an access request received from an external device, and means for making and transmitting a first request from said access request to said file system processor;
   said file system processor has means for receiving said first request from said network processor;
   means for making a second request for getting access to the storage device from said first request, and
   means for transmitting said second request to said disk processor;
   said disk processor has means for receiving said second request, and
   means for controlling data transfer between said cache memory and said storage device in accordance with said second request,
   wherein, when a failure occurs in a first storage controller, a second storage controller takes over the processing of the first storage controller by using a log area corresponding to the first storage controller, and
   wherein said cache memory has a log area corresponding to each of said plural storage controllers, and said storage controller stores said first data to said corresponding log area.

2. A storage system according to claim 1, wherein said plural storage controllers can get access to each of said plural log areas.

3. A storage system according to claim 1, wherein said cache memory is backed up by a battery.

4. A storage system according to claim 1, wherein said second request includes information showing the position of data stored to said log area, and
   said disk processor has means for transferring the data within said log area to said storage device by using the information showing the position of said data.

5. A storage system according to claim 1, wherein said first data includes an identifier showing an arrival order from a client, and
   said file system processor sets said identifier to one portion of managing information of said file system when the file system of said storage device is changed.

6. A storage system comprising a cache memory, plural storage controllers and a storage device,
   in which said cache memory is connected to said plural storage controllers;
   said storage controller has a network processor, a file system processor and a disk processor;
   said network processor has means for making and storing first data for storage to said cache memory from an access request received from an external device, and
   means for making and transmitting a first request from said access request to said file system processor;
   said file system processor has means for receiving said first request from said network processor;
   means for making a second request for getting access to the storage device from said first request, and
   means for transmitting said second request to said disk processor;
   said disk processor has means for receiving said second request, and
   means for controlling data transfer between said cache memory and said storage device in accordance with said second request,
   wherein, when a failure occurs in a first storage controller, a second storage controller takes over the processing of the first storage controller by using a log area corresponding to the first storage controller, and
   wherein said storage controller has a shared cache access section, and said shared cache access section performs data transfer between a memory arranged in each of said network processor, said file system processor and said disk processor, and said cache memory, and
   wherein said disk processor has means for giving instructions to said shared cache access section such that the data of an address of said log area are copied at a specific address of said cache memory.

7. A storage system comprising a cache memory, plural storage controllers and a storage device,
   in which said cache memory is connected to said plural storage controllers;
   said storage controller has a network processor, a file system processor and a disk processor;

said network processor has means for making and storing first data for storage to said cache memory from an access request received from an external device, and means for making and transmitting a first request from said access request to said file system processor;

said file system processor has means for receiving said first request from said network processor;

means for making a second request for getting access to the storage device from said first request, and means for transmitting said second request to said disk processor;

said disk processor has means for receiving said second request, and means for controlling data transfer between said cache memory and said storage device in accordance with said second request, wherein, when a failure occurs in a first storage controller, a second storage controller takes over the processing of the first storage controller by using a log area corresponding to the first storage controller, and wherein said storage controller has a shared cache access section, and said shared cache access section performs data transfer between a memory arranged in each of said network processor, said file system processor and said disk processor, and said cache memory, and wherein said storage controller has means for detecting that a failure has happened in another storage controller;

means for obtaining an identifier corresponding to data already stored to said storage device from said storage device;

means for retrieving the data corresponding to said identifier from said log area by using said identifier; and means for storing data having an identifier newer than said identifier to said storage device when the data having the newer identifier exist in said log area.

* * * * *